July 31, 1956 R. B. TOMER 2,757,228
COLOR TELEVISION SYSTEM
Filed Nov. 28, 1951

INVENTOR
Robert B. Tomer
BY: George W Crowley
AGENT 2,757,228

COLOR TELEVISION SYSTEM

Robert B. Tomer, Danvers, Mass., assignor to Columbia Broadcasting System, Inc., Salem, Mass., a corporation of New York, doing business as Hytron Radio & Electronics Co.

Application November 28, 1951, Serial No. 258,566

6 Claims. (Cl. 178—5.4)

Figure 1:
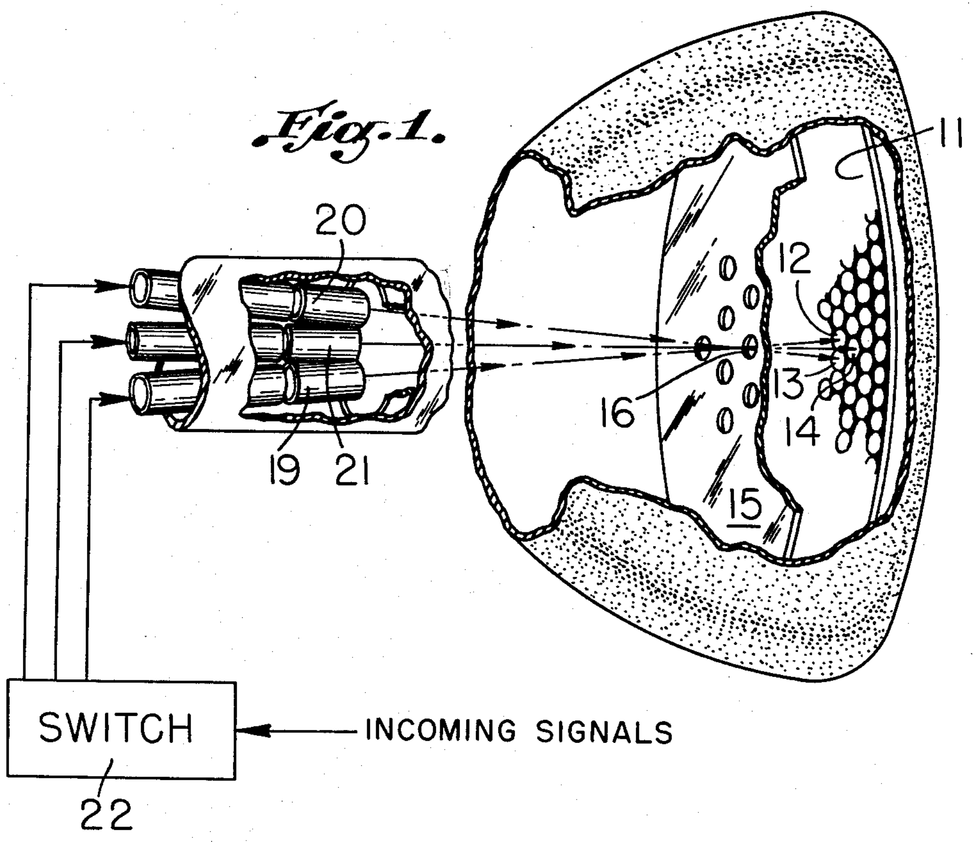

This invention relates in general to color television and in particular to a system and method for increasing light output from the picture tube of a field sequential color television system.

The aim of all color television systems is to present images of the subject at the receiver in colors as they are found in the subject. To accomplish this result, substantially all of the colors of the visible spectrum from violet to red should be reproducible at the receiver. It is not necessary, however, that each of these colors be individually reproducible at the receiver because of certain characteristics of the human eye. Red, blue and green are the colors to which the eye is particularly sensitive and other colors of the spectrum may be produced by properly combining these colors. Furthermore, when red, blue and green are added together in equal intensities they appear white to the viewer. For this reason, red, blue and green are known as the additive primary colors.

In all present color television systems, color in the picture is produced by using, in one way or another, the additive primaries. For example, in the all-electronic picture tube of the dot sequential system many thousands of phosphor dots form the screen of the tube. These dots are symmetrically disposed in similar triads, each triad containing a red, a green and a blue dot. When it is desired to produce a red image on the screen, a first electron gun of the picture tube activates only the appropriate red dots. A second electron gun is provided for activating appropriate green dots and a third for appropriate blue dots. Each of the primary colors, when produced alone, is developed by the action of a single electron gun. Colors other than the primary colors are seen by the eye when two or more of the primary colors are simultaneously produced. In other words, more than one gun is operated to produce at a given instant a color which is not a pure additive primary.

In field sequential color television a complete frame is transmitted for each of the primary colors. If the all-electronic picture tube is used in a field sequential system, only the red dots of appropriate triads are energized by the "red electron gun" and the same holds true for the green and the blue electron guns. At no time is it possible to operate more than one electron gun and preserve color fidelity. The result of this limitation is obviously a decrease in light output from the picture tube screen. This is easily seen by considering the total area of the screen. Disregarding geometric considerations involved in the arrangement of three circular dots in each triad, it can be said that during any given frame only one-third of the available screen area is utilized. As a result of this failure to use two-thirds of the available screen area, the light output during a given frame is substantially one-third of the potential light output of the screen.

Aside from considerations of screen area, the mere fact that white light is composed of the three additive primaries, only one of which is displayed at a given time, indicates that light output will be one-third that which would be available if white light were being displayed.

Therefore, it is an object of the present invention to provide a novel system and method for the presentation of television signals in color.

It is a further object of the present invention to provide more efficient utilization of screen area in color television picture tubes.

It is a still further object of the present invention to provide increased light output in field sequential color television picture presentation.

The present invention consists generally in a system and method for utilizing the so-called subtractive primary colors in the phosphors of the picture tube screen, rather than the conventional additive primary colors. The subtractive primary colors are so termed because each of them is white light minus an additive primary color. They are the result of subtracting one of the additive primaries from white light. They are: white light minus red, or cyan; white light minus green, or magenta; and white light minus blue, or yellow. As will be explained in greater detail hereinbelow, the subtractive primary colors when added together in equal intensities also produce white when used as emitters. When used as filters, the subtractive primaries eliminate, or subtract one corresponding additive primary. The three subtractive primaries, when used as filters produce black, the absence of all three additive primaries. Furthermore, when the subtractive primary colors are added together in pairs, either as filters or as emitters, each pair produces an additive primary color. In one form of this invention, a cathode ray tube having three electron guns and a multicolor phosphor screen is used. The three electron guns are used in conjunction with phosphor covered screen areas of yellow, cyan and magenta causing a doubling of light output. This doubling is effected by the use of two guns rather than a single gun in each color frame. These two guns simultaneously energize the two subtractive primary colors which combine to produce the desired additive primary color. For example, during the reception of the red field the yellow and magenta phosphors are energized, each by its respective gun. The two colors, yellow and magenta, are then integrated by the eye of the viewer to produce red. Similar combinations of other pairs of the subtractive primary colors result in the production of the other additive primary colors. Intermediate colors are produced by varying the intensity of coupled subtractive primary colors which is tantamount to varying intensity of individual additive primary colors.

Figure 2:
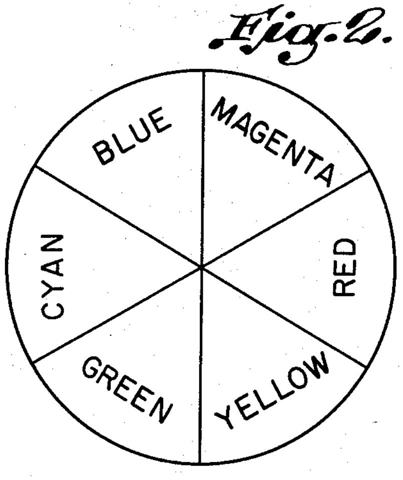

For a better understanding of the present invention together with other and further objects, features and advantages reference should be made to the following description which is to be read in connection with the accompanying drawing in which:

Fig. 1 is a schematic view, partly cut away, of one embodiment of the present invention using phosphors of the subtractive primary colors; and Fig. 2 is a graphic illustration of a color chart to aid in understanding the underlying color concepts involved in the present invention.

Referring now to Fig. 1 of the drawing, there is disclosed the picture tube of a receiver of a field sequential color television system. The screen 11 of the tube is composed of a transparent glass member on the inside of which myriads of dots of phosphor are deposited. The dots are disposed in similar triangular patterns or triads and each triad includes three dots of phosphor for producing the colors yellow, cyan and magenta, dots 12, 13 and 14 being representative. A mask 15 somewhat similar in design to screen 11 has openings formed therein which are disposed in register with the geometric centers of the triads of screen 11, opening 16, for example, being substantially in register with the center of the triad formed by dots 12, 13 and 14 respectively.

In the neck of the picture tube, there are three electron guns 19, 20 and 21 which are arranged to operate in conjunction with dots 12, 13 and 14 respectively as well as with the appropriate dots of the other triads on the face of the tube.

The circuity involved in switching the guns in color phase with the transmitter and for maintaining proper registration with the phosphor dots is well known to those skilled in the art and need not be described in detail herein since this particular element is not the subject of the present invention.

When the red field is being received and it is desired to present that field on screen 11, guns 19 and 21 are simultaneously energized in equal intensities since these guns energize dots 12 and 14. The two subtractive colors, yellow and magenta, are produced upon the screen by dots 12 and 14 resulting in an impression of red in the eye of the viewer wherein the yellow and magenta colors are integrated. Similarly, during the occurrence of the green field, guns 19 and 20 are energized and each projects a beam to dot 12 and dot 13 respectively to produce the colors yellow and cyan which are integrated in the eye of the viewer to produce the desired green color. Again, during the occurrence of the blue field, guns 20 and 21 are energized and produce beams which activate dots 13 and 14, respectively, producing the subtractive colors, cyan and magenta, the integration of these colors being blue to the eye of the viewer.

In order to energize the appropriate guns for each given frame no radical departure from circuity involved in energizing individual electron guns in the additive primaries system is required. Guns 19, 20 and 21 are schematically shown as they are used in combination with switching member 22. Incoming signals are applied to the rotor of switching member 22 which in any of its three positions is in contact with two of the subtractive primary guns. For example, during the reception of the red field rotor of switch 22 is in contact with guns 19 and 21, the signal occurring during the red field being applied simultaneously thereto. While this switching circuit has been described mechanically for purposes of easier understanding, electronic switching means of a relatively simple design is actually used in the preferred embodiment of the invention. Such electronic switching means are well known and may take the form of gating tubes which are switched in proper sequence by a multivibrator, the multivibrator being synchronized in operation with the transmitter by color pulses radiated therefrom. Many other switching circuits well known to those skilled in pulse techniques would operate equally well to provide the desired switching function.

Referring now to Fig. 2 of the drawing, with the aid of certain fundamental principles illustrated therein, the operation of the above-described system may be more readily understood by examination of the following postulates:

I. When two additive primaries are combined, they produce the subtractive primary which lies between them on the chart of Fig. 2.

II. When an additive primary and a subtractive primary are added across the center of the chart, white is produced, colors located in such juxtaposition being complementary.

III. When two subtractive primaries are combined, they produce the additive primary which lies between them on the chart.

As is obvious much of the underlying theory of the present invention is based upon the third of the above postulates. Production of intermediate shades is accomplished in much the same manner as in conventional field sequential color television. The additive primary colors are of course produced by the combination of appropriate subtractive primary colors. Intermediate colors which are produced by varying the intensities of the additive primary colors individually in conventional field sequential systems are produced in the present invention by varying the intensities of the pairs of coupled subtractive primaries, each pair of which produces one of the additive primary colors. In other words, the varying signal normally applied to each gun of the conventional system is applied to a pair of the coupled guns of this invention.

While what has been disclosed is a particular version of the present invention, it is obvious that the applicability of the concepts of producing additive primary colors by suitable combinations of subtractive primary colors should not be limited only to the details of a dot type tube as disclosed herein, since successful operation is possible with other geometric designs such as the line-type phosphors or any other screen design where three color phosphors are placed in cooperating relationship to produce a color image. The invention should only be limited by the state of the prior art and the scope of the appended claims.

What is claimed is:

1. In a field sequential color television a picture tube having a transparent screen on the end thereof and electron emitting apparatus in the other end thereof, said electron emitting apparatus including first, second and third electron guns, first, second and third phosphor deposits symmetrically disposed on the inner surface of said screen, means for activating said first phosphor deposit by electron beams from said first electron gun, means for activating said second phosphor deposit by electron beams from said second electron gun and means for activating said third phosphor deposit by electron beams from said third electron gun, said first phosphor deposit being adapted to produce magenta light upon activation thereof by an electron beam, said second phosphor deposit being adapted to produce yellow light upon activation thereof by an electron beam, said third phosphor deposit being adapted to produce cyan light upon activation thereof by an electron beam, means for energizing said first and second guns simultaneously during reception of red field signals by said system, means for energizing simultaneously said second and third electron guns during reception of green field signals by said system, and means for energizing simultaneously said first and third electron guns during reception of blue field signals by said system.

2. In a field sequential color television system, apparatus for producing images in color on the picture tube of said system comprising, deposits of first, second, and third phosphors on the inner surface of the screen of said picture tube, said phosphors each being adapted to produce light of a separate subtractive primary color upon activation thereof by an electron beam, and means for activating sequentially said first and second phosphor deposits, said second and third phosphor deposits, and said first and third phosphor deposits in response to sequential color field signals received by said system.

3. In a field sequential color television system, apparatus for producing images in color on the picture tube of said system comprising, deposits of first, second, and third phosphors on the inner surface of the screen of said picture tube, said first phosphor being adapted to produce magenta light upon activation thereof by an electron beam, said second phosphor being adapted to produce yellow light upon activation thereof by an electron beam, said third phosphor being adapted to produce cyan light upon activation thereof by an electron beam, and means for activating sequentially said first and second phosphor deposits, said second and third phosphor deposits, and said first and third phosphor deposits in response to sequential color field signals received by said system.

4. In a field sequential color television system, apparatus for producing images in color on the picture tube of said system comprising, phosphor deposits upon the inner surface of the screen of said tube, each of said phosphor deposits being adapted to produce light of a separate subtractive primary color upon activation thereof by an electron beam, and means for activating sequentially pairs of said phosphor deposits in response to sequential color field signals received by said system.

5. Apparatus for producing images in color on the picture tube of a field sequential color television system comprising, first, second and third electron guns disposed within the neck of said picture tube, said picture tube having a transparent screen, the inner surface of which is being divided into a pluralty of substantially equal areas, each of said areas being divided into first, second and third substantially equal sub-areas, a first phosphor deposit upon each of said first sub-areas, a second phosphor deposit upon each of said second sub-areas and a third phosphor deposit upon each of said third sub-areas, said first phosphor deposit being adapted to produce magenta light upon activation thereof by an electron beam, said second phosphor deposit being adapted to produce yellow light upon activation thereof by an electron beam, and said third phosphor deposit being adapted to produce cyan light upon activation thereof by an electron beam, means for activating said first and said second phosphor deposits upon reception of red field signals by said system, means for activating said second and third phosphor deposits upon reception of green field signals by said system, and means for activating said first and third phosphor deposits upon reception of blue field signals by said system.

6. Apparatus for producing images in color on the picture tube of a field sequential color television system comprising, first, second, and third electron guns disposed within the neck of said picture tube, a transparent screen forming the large end of said picture tube opposite said electron guns, first, second, and third phosphor dots symmetrically disposed in a series of similar triads on the inner surface of said screen, a mask disposed between said electron guns and said screen adjacent said screen and having a plurality of openings formed therein, each of said openings being substantially in register with the center of one of said triads, said first phosphor dots being adapted to produce magenta light upon excitation thereof by an electron beam from said first electron gun, said second phosphor dots being adapted to produce yellow light upon excitation thereof by an electron beam from said second electron gun, said third phosphor dots being adapted to produce cyan light upon excitation thereof by an electron beam from said third electron gun, and switch means for energizing simultaneously said first and second electron guns during reception of red field signals by said system, said second and third electron guns during reception of green field signals by said system, and said first and third electron guns during reception of blue field signals by said system.

References Cited in the file of this patent

UNITED STATES PATENTS

| | | |
|---|---|---|
| 2,294,820 | Wilson | Sept. 1, 1942 |
| 2,566,693 | Cherry | Sept. 4, 1951 |
| 2,587,074 | Sziklai | Feb. 26, 1952 |

FOREIGN PATENTS

| | | |
|---|---|---|
| 866,065 | France | June 16, 1941 |

OTHER REFERENCES

Physical Optics, Wood, 1929, pp. 14–17.

Theoretical and Experimental Optics, Valasek, pp. 329, 330.